United States Patent
Dua et al.

(10) Patent No.: US 7,603,004 B2
(45) Date of Patent: Oct. 13, 2009

(54) NEURAL NETWORK DEMODULATION FOR AN OPTICAL SENSOR

(75) Inventors: Rohit Dua, Mineola, NY (US); Steve E. Watkins, Salem, MO (US); Donald C. Wunsch, Rolla, MO (US)

(73) Assignee: University of Missouri Rolla, Rolla, MO (US)

(*) Notice: Subject to any disclaimer, the term of this patent is extended or adjusted under 35 U.S.C. 154(b) by 0 days.

(21) Appl. No.: 11/761,814

(22) Filed: Jun. 12, 2007

(65) Prior Publication Data

US 2007/0297714 A1 Dec. 27, 2007

Related U.S. Application Data

(60) Provisional application No. 60/804,512, filed on Jun. 12, 2006.

(51) Int. Cl.
   G02B 6/00 (2006.01)
   G02B 6/26 (2006.01)
   G02B 6/42 (2006.01)
   G02B 6/34 (2006.01)

(52) U.S. Cl. .............................. 385/12; 385/15; 385/31; 385/37

(58) Field of Classification Search .................. None
   See application file for complete search history.

(56) References Cited

U.S. PATENT DOCUMENTS

| | | | | |
|---|---|---|---|---|
| 5,180,911 A | * | 1/1993 | Grossman et al. | 250/227.21 |
| 5,564,832 A | * | 10/1996 | Ball et al. | 374/161 |
| 6,888,125 B2 | * | 5/2005 | Ronnekleiv et al. | 250/227.19 |
| 7,127,132 B1 | * | 10/2006 | Moslehi et al. | 385/12 |
| 2005/0046584 A1 | * | 3/2005 | Breed | 340/825.72 |

* cited by examiner

*Primary Examiner*—Tina M Wong
*Assistant Examiner*—Chris H Chu
(74) *Attorney, Agent, or Firm*—Polsinelli Shughart PC (57) ABSTRACT

Methods and systems of neural network demodulation for an optical sensor. An optical sensor may be coupled to a structure and be capable of reflecting a reflected optical signal. A wavelength of the reflected optical signal may be spread based on a strain being applied to the structure. A replication device may receive the reflected optical signal from the optical sensor and produce a plurality of optical signals. A filter may be coupled to the replication device to receive an optical signal from the plurality of optical signals and filter the received optical signal. A detector may receive the filtered optical signal and provide a voltage output proportional to an amount of the filtered optical signal received. A neural network may receive the voltage output and determine the strain on the structure.

22 Claims, 8 Drawing Sheets

NEURAL NETWORK DEMODULATION FOR AN OPTICAL SENSOR

CROSS-REFERENCE TO A RELATED APPLICATION

This application claims the benefit of U.S. Provisional Patent Application entitled "Neural Network Demodulator for Optical Sensor", Ser. No. 60/804,512, filed 12 Jun. 2006, the entire contents of which are herein incorporated by reference.

TECHNICAL FIELD

The present application relates generally to the field of signal processing and, in one specific example, to a method and system for demodulating an optical signal using a neural network.

BACKGROUND

Strain sensing is used in a Health Monitoring System (HMS) for civilian, mechanical, and aerospace applications. The choice of sensor types for a given sensing application may depend upon a parameter being measured and the physical properties of the sensor. The parameter being measured can be strain, temperature, pressure, or force on a structure.

Common fiber optic sensors may be based on interferometric, attenuation, and spectral effects. Two major categories of fiber optic strain sensors are the Fabry-Perot interferometric and Bragg grating sensors. The irradiance output changes with strain for Fabry-Perot sensors and the wavelength output changes with strain for Bragg grating sensors. The relationship between the irradiance output and applied strain may be highly non-linear for Fabry-Perot sensors, where as the spectral shift may be linear for Bragg grating sensors. This linear property may make Bragg gratings desired sensors in strain sensing applications.

BRIEF DESCRIPTION OF THE DRAWINGS

Some embodiments are illustrated by way of example and not limitation in the figures of the accompanying drawings in which.

DETAILED DESCRIPTION

Example methods and systems for neural network demodulation for an optical sensor are described. In the following description, for purposes of explanation, numerous specific details are set forth in order to provide a thorough understanding of example embodiments. It will be evident, however, to one skilled in the art that the present invention may be practiced without these specific details.

In an example embodiment, an optical sensor may be coupled to a structure. The optical sensor may receive a source optical signal and reflect a reflected optical signal. At least one wavelength of the reflected optical signal may be spread based on a strain being applied to the structure. A replication device may be coupled to the optical sensor. The replication device may receive the reflected optical signal from the optical sensor and produce a plurality of optical signals. At least one filter may be coupled to the replication device to receive an optical signal from the plurality of optical signals and filter the received optical signal. At least one detector may be coupled to the at least one filter to receive the filtered optical signal and provide an output signal representing an amount of the filtered optical signal received. A neural network may be coupled to the at least one detector. The neural network may receive the output signal from the at least one detector and determine the strain on the structure.

In an example embodiment, a reflected optical signal may be received from an optical sensor. The optical sensor may be coupled to a structure. At least one wavelength of the reflected optical signal may be spread based on a strain being applied to the structure. The reflected optical signal may be replicated to produce a plurality of optical signals. At least one of the plurality of optical signals may be filtered to produce at least one filtered optical signal. The at least one filtered optical signal may be detected to determine an output signal representing an amount of the at least one filtered optical signal. A neural network analysis may be performed on the output signal to determine an amount of strain applied to the structure.

In an example embodiment, a reflected optical signal may be received from an optical sensor. The optical sensor may be coupled to a structure. At least one wavelength of the reflected optical signal may be spread based on a strain being applied to the structure. The reflected optical signal may be decomposed to produce a plurality of different components of the reflected optical signal. The plurality of different components may be filtered to produce a plurality of filtered components. The plurality of filtered components may be detected to determine an output signal representing an amount of the at least one filtered optical signal. A neural network analysis may be performed on the signal output to determine an amount of strain applied to the structure.

Figure 1:
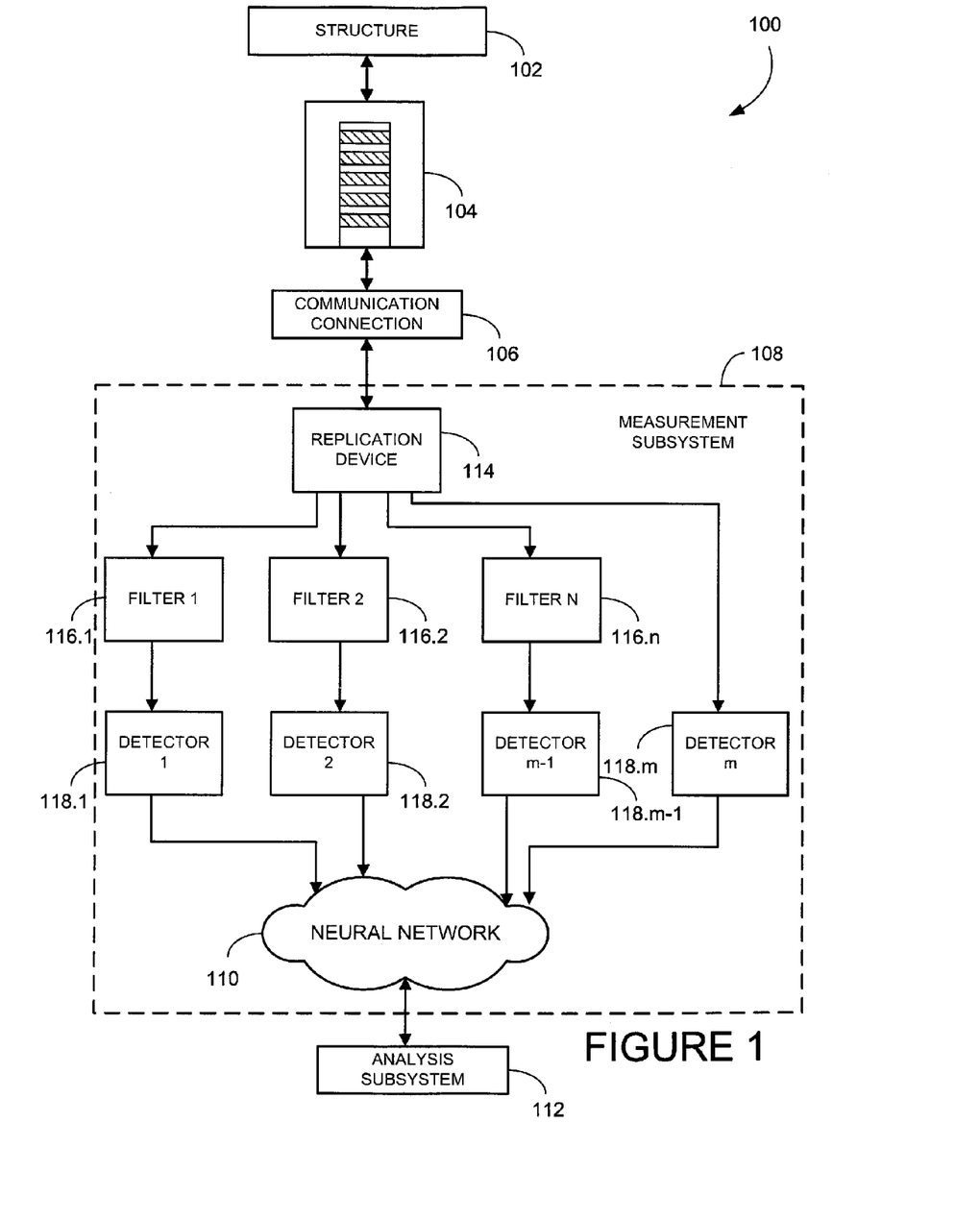
FIGS. 1-2 are block diagrams of a measurement system for a structure according to an example embodiment.

FIG. 1 illustrates an analysis system 100 according to an example embodiment. The analysis system 100 includes an optical sensor 104 coupled to a structure 102. The optical sensor 104 receives a source optical signal and reflects a reflected optical signal with at least one wavelength of the reflected optical signal being spread based on a strain being applied to the structure 102. The optical sensor 104 may be a fiber optical sensor (e.g., a Bragg optical grating sensor), however other types of sensors may also be used.

The structure 102 may be, for example, an automotive structure, an aircraft structure, or a civil engineering structure. For example, if the analysis system 100 is deployed in a civil application, the optical sensor 104 may be attached underneath a bridge or to a beam in a building. The analysis system 100 may be used to monitor health of the structure 102 to determine whether, for example, the structure is in danger of buckling or collapsing. The analysis system 100 may be used to monitor strain, movement, integrity, and the like.

The analysis system 100 may further include a measurement subsystem 108 coupled to the optical sensor 104 through a communication connection 106. The measurement subsystem 108 may be used for sensing that may lead to a shift in wavelength. For example, the measurement subsystem 108 may be used for one or more parameters that may be associated with the shift such as strain sensing, temperature sensing, pressure sensing, force on the structure 102 and the like.

The communication connection 106 may be fiber, a cable, a wire, an optical transmission medium, or the like through which wavelengths of light or their equivalents may travel from the optical sensors 104 to a measurement subsystem 108.

By way of an example, when wavelengths of an optical signal are sent through the communication connection 106, the optical sensor 104 may reflect a narrow band of the wavelengths of the optical signal to the measurement subsystem 108. If the structure 102 is under a strain, the optical sensor 104 may be stretched. The stretching of the optical sensor 104 may cause a reflection from a mechanism within the optical sensor 104 to shift a spread of the wavelengths of light that returns to the measurement subsystem 108. By determining the shift of the spread of the wavelengths of the optical signal, the stretch on the structure 102 may also be determined.

The measurement subsystem 108 may include a replication device 114, one or more filters 116.1-116.n, and/or one or more detectors 118.1-118.m. The replication device 114 may be coupled to the optical sensor 104 through the communication connection 106. The replication device 114 receives the reflected optical signal from the optical sensor 104 and produces a plurality of optical signals. For example, the replication device 114 may be a splitter, an expander, or the like. The replication device 114 may include a lens or a Tensing system (e.g., a circularizing lens) and/or an optical grating. For example, the replication device 114 may include a lens that may spread out the reflected optical signal and provide the plurality of optical signals to the one or more filters 116.1-116.n.

The measurement subsystem 108 may demodulate a spectral shift in the reflected optical signal for purposes of measurement (e.g., strain measurement) by using, for example, multiple channels for processing a reflected optical signal to overcome limitations (e.g., noise) within the analysis system 100.

The one or more filters 116.1-116.n are coupled to the replication device 114 to receive an optical signal from the plurality of optical signals and filter the received optical signal. The spectral characteristics of the filters 116.1-116.n may be known to the measurement subsystem 108.

The filters 116.1-116.n may include a filter that changes output upon receiving a change in wavelength or spectrum from the optical sensor 104. For example, a filter profile of the filters 116.1-116.n may include a first filter profile that is monotonically increasing with wavelength, a second filter profile that is monotonically decreasing with wavelength, and a third filter profile that is roughly centered with a zero strain point of the optical sensor 104.

The one or more filters 116.1-116.n may include one or more interferometric filters and/or one or more absorption filters. Other types of filters may also be used.

The one or more filters 116.1-116.n may include at least one filter having a linear or close-to-linear characteristic and/or a nonlinear characteristic. A type of the filters 116.1-116.n selected for use within the measurement subsystem 108 may include a filter section that provides a positive slope and a negative slope in response to strain in the structure 102. For example, the positive slope and the negative slope may be linear or near linear over a string range.

The one or more filters 116.1-116.n may include a low profile filter, a high profile filter and a band pass profile filter. For example, the low profile filter and the high profile filter may provide a nearly linear change in the filtered optical signals provided to the one or more detectors 118.1-118.m. All of the one or more filters 116.1-116.n need not extract strain information, but may extract additional information.

In an example embodiment, an optical to digital conversion or an optical to analog conversion may occur prior to the receipt of the plurality of optical signals by the one or more filters 116.1-116.n. A spectrum analyzer may be used for analyzing the optical signal.

The one or more detectors 118.1-118.m may receive the filtered optical signal and provide an output signal representing an amount of the filtered optical signal received. For example, the output signal may be a voltage output that is proportional to an amount of the filtered optical signal received. The one or more detectors 118.1-118.m may each be coupled to either one or more filters 116.1-116.n or directly to the replication device 114. The optional unfiltered reflected optical signal received from the replication device 114 may act as a normalizing factor. An output from the detectors 118.1-118.m may be scaled from −1 to 1.

The one or more detectors 118.1-118.m may collectively include one or more photodetectors. For example, the one or more detectors 118.1-118.m may collectively be a single photodetector (e.g., a quad photodetector).

A number of the filters 116.1-116.n may be equal to a number of the detectors 118.1-118.m or less than a number of the detectors 118.1-118.m.

A neural network 110 (e.g., an artificial neural network) is coupled to the one or more detectors 118.1-118.m. The neural network 110 may be capable of receiving the output signal from the one or more detectors 118.1-118.m and determining the measurement data (e.g., strain) on the structure 102. The neural network 110 may be pretrained on, have solved for from mathematical or other models, adapt in real-time, or otherwise have access to the characteristics of the filters 116.1-116.n and use the characteristics when determining the strain on the structure 102.

The neural network 110 may be a type of neural network that is capable of performing regression or function approximation. For example, the neural network 110 may be a simple neural network or a complex neural network. The neural network 110 may include an interconnected assembly of simple processing elements and/or a multi-layered feedforward neural network.

The neural network 110 may include a two layer network with a hidden layer and an output layer. A number of neurons in the hidden layer may differ based on application of the measurement subsystem 108. Transfer functions for neurons in the hidden and the output layer of the neural network 110 may be hyperbolic tangent and linear, respectively. Other types of networks and/or transfer functions may also be used.

A processing ability of the neural network 110 may be stored in the interunit connection strengths obtained by a process of adaptation to, or learning from, a set of training patterns. In an example embodiment, the training and testing of the neural network 110 may be performed using MATLAB 'Neural Network Toolbox'. The neural network 110 may be implemented with or without special software tools for development of the neural network 110.

The neural network 110 may be trained using a Levenberg-Marquardt training algorithm, backpropagation training algorithm (BPNN), Adaptive Resonance Theory, Probabilistic Neural Networks, Support Vector Machines, Extended Kalman Filter, Particle Swarm Optimization, and/or Genetic Algorithms. However, other training algorithms may also be used.

Statistical learning techniques may be used to train the neural network 110. The neural network 110 may be a training system with applied statistical learning techniques that convert the training system into a set of rules.

The neural network 110 may receive an additional signal such as a signal from an additional temperature sensor. For example, the additional sensor may include a temperature sensor so that the neural network 110 may provide adequate temperature compensation (e.g., for ambient temperature). The additional sensor may include a sensor capable of receiving a time and date signal, humidity, wind speed and tides and other environmental factors, and the like.

A complexity of the neural network 110 may be based on a precision of measurement desired. For example, if a user wants to detect a strain using the analysis system 100 with a resolution of five micro strain, a simpler neural network system 110 as compared to if the user wants the resolution to be one micro strain.

The complexity of the neural network 110 may be based on noise in the analysis system 100, attenuation in the analysis system 100, problems encountered in making a reading using the measurement subsystem 108 and the like. For example, a first neural network 110 may use twenty to thirty neurons, a second neural network 110 that is reading a temperature composition may use fifty to sixty neurons, and a third neural network 110 with noise and attenuation problems may use up to one hundred neurons.

The detectors 118.1-118.$m$ may provide parallel inputs to the neural network 110 to enable an absolute strain or shift in the optical signal to be detected.

A further signal provided from the neural network 110 to an analysis subsystem 112 may indicate a measured amount of strain. The analysis subsystem 112 may optically be coupled to the neural network 110 to receive the further signal for further processing and analysis.

The measurement subsystem 108 and the analysis subsystem 112 may be combined into a combination device or individually implemented on one or more devices. The devices may include a single processor or multiple processors for purposes including speed and parallel processing.

Figure 2:
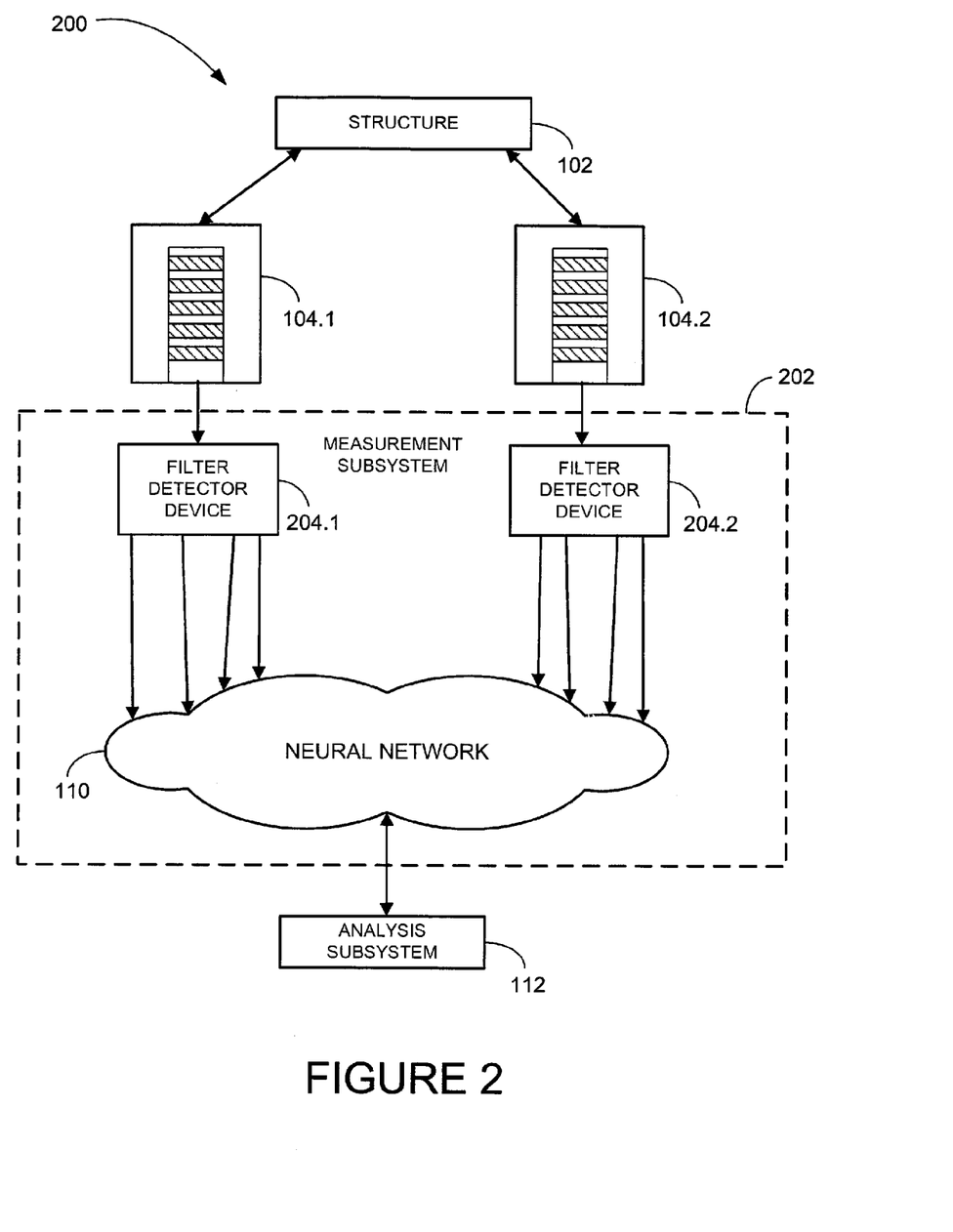

FIG. 2 illustrates an analysis system 200 according to an example embodiment. Multiple optical sensors 104.1, 104.2 may be coupled to the structure 102 to measure more than one parameter of the structure. The optical sensors 104.1, 104.2 may respectively be coupled to multiple filter detector devices 204.1, 204.2 that include the replication device 114, the one or more filters 116.1-116.$n$ and the one or more detectors 118.1 (see FIG. 1). For example, the multiple filters 116.1-116.$n$ may each be in front of a plurality of components of a quad photodetector.

The filter detector devices 204.1., 204.2 may provide an output to the neural network 110, which may then provide a further output to the analysis subsystem 112.

The measurement subsystem 202 may be used with the optical sensor 104.1 as a dummy sensor to enable, by way of example, an additional environmental factor such as humidity, wind speed and tides to be considered.

Figure 3:
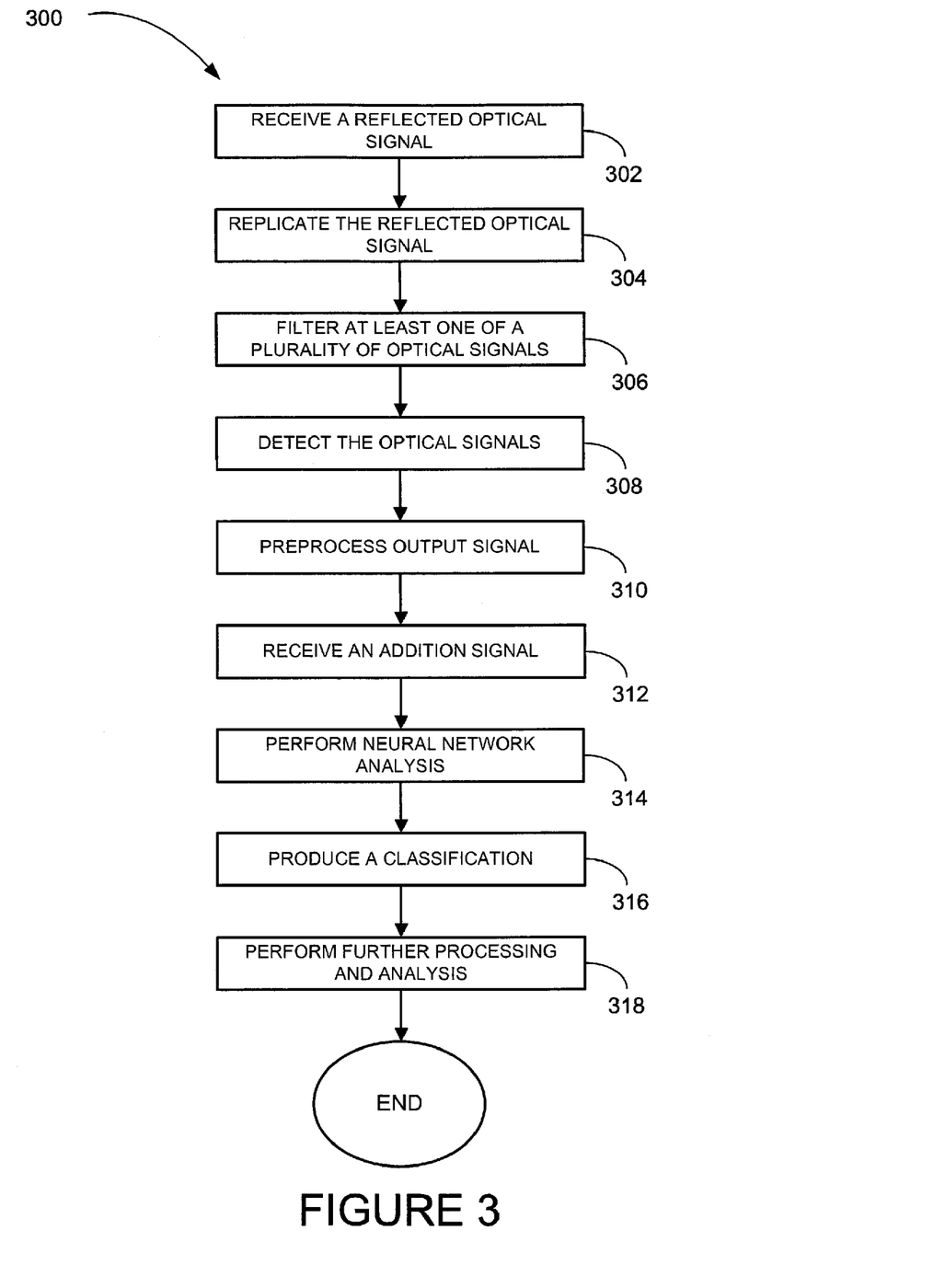
FIGS. 3-4 illustrate a method for optical detection analysis according to an example embodiment.

FIG. 3 illustrates a method 300 for optical detection analysis according to an example embodiment. The method 300 may be performed by the measurement subsystem 108, the measurement subsystem 202, or another device according to an example embodiment.

A reflected optical signal is received from the optical sensor 104 coupled to the structure 102 at block 302. The reflected optical signal may be received in response to an original optical signal sent to the optical sensor and at least one wavelength of the reflected optical signal may be spread relative to the original optical signal based on a strain being applied to the structure 102. The at least one wavelength of the reflected optical signal may be a center wavelength (e.g., with a linear shift) or another wavelength.

A change in an output of the optical sensor 104 for an applied strain to the structure 102 may be characterized by a linear shift in a center wavelength. A center wavelength for the optical sensor 104 may be 1.5 µm, while a working range of the wavelengths may be 1.496 µm to 1.504 µm. For example, when three strain values −3000 µε, 0 µε and +3000 µε are used, a linear shift centered near 1.496 µm may be observed for −3000 µε, no shift may be observed for 0 µε, and a linear shift centered near 1.504 µm may be observed for +3000 µε. Other center wavelengths and working ranges may be used.

The shift in the center wavelength may be approximately linear with respect to applied strain and temperature. The spectrum of the reflected optical signal may only be shifted and a distribution around a center wavelength may not change.

The reflected optical signal is replicated to produce a plurality of optical signals at block 304. For example, each of the plurality of optical signals may have same characteristics as the reflected optical signal. At least one of the plurality of optical signals is filtered to produce at least one filtered optical signal at block 306.

At block 308, the filtered optical signal is detected to determine a an output signal representing an amount of the filtered optical signal. An unfiltered optical signal may optically be detected at block 308 from the plurality of optical signals to determine the output signal representing an amount of the unfiltered optical signal.

The output signal may be preprocessed at block 310. For example, preprocessing the voltage output may include scaling the output signal or normalizing the output signal. Other types of preprocessing may also be performed. Preprocessing may be used with training the neural network 110.

An additional signal may be received from an additional sensor at block 312. The sensor additional may be a temperature sensor, a time and date sensor, or an environmental factor sensor.

The neural network analysis is performed at block 314 to determine the amount of strain applied to the structure 102. The neural network 110 may process the information received and, based on training, provide a strain analysis while taking into consideration noise. The neural network analysis may be performed on the output signal, the preprocessed output, or on the output signal using the additional signal.

In an example embodiment, the neural network 110 may be trained prior to performing the operations at block 314 to account for variations in the analysis system 100. For example, the neural network 110 may be trained to account for variations in a source optical signal sent from a light source, signal loss in the communication connection 106, variations in the one or more filters 116.1-116.$n$ and the like.

The neural network 110 may be developed for changing field parameters such as noise, filter non-linearity and amplitude variation and to account for practical issues regarding source, filters, and multiplexing. The neural network 110 may be trained to handle a profile of the one or more filters 116.1-116.$n$.

A classification may be produced on the strain at block 316. The classification may include a user-defined category (e.g., severe, moderate, or mild), classification of the damage that may have resulted from the strain, or the like. The classification may be refined before or after it is provided to a user by observation of the strain and/or damage by use of other techniques and/or training of the neural network 110.

At block 318, further processing and analysis may optionally be performed on the amount of strain applied to the structure 102.

Figure 4:
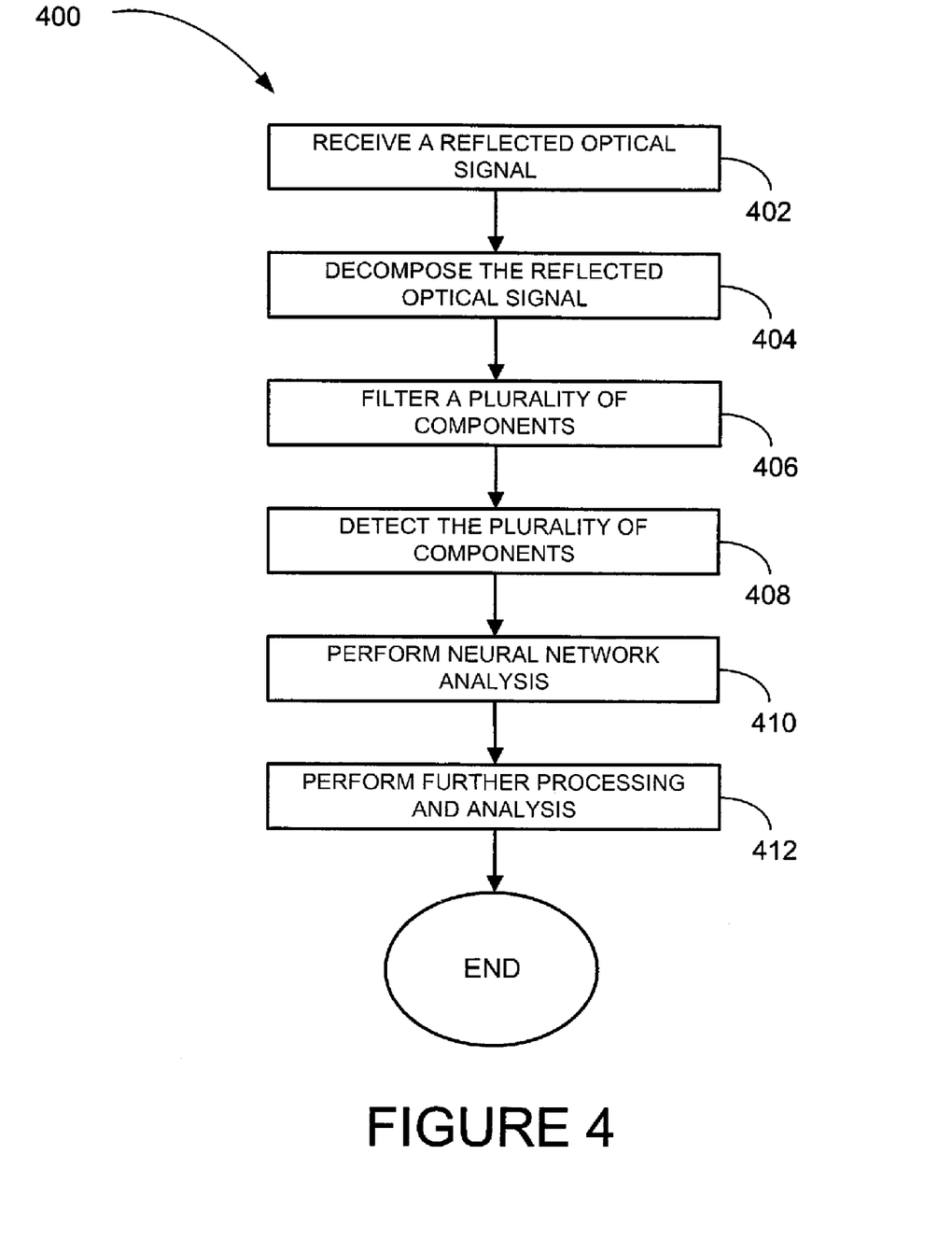

FIG. 4 illustrates a method 400 for optical detection analysis according to an example embodiment. The method 400 may be performed by measurement subsystem 108, the measurement subsystem 202, or another device according to an example embodiment.

A reflected optical signal is received from the optical sensor 104 coupled to the structure 102 at block 402.

At block 404, the reflected optical signal is decomposed to produce a plurality of different components of the reflected optical signal. Decomposing information from the reflected optical signal may be providing different components of the reflected optical signal to the one or more filters 116.1-116.$n$.

The plurality of different components is filtered to produce a plurality of filtered components at block 406.

The plurality of filtered components is detected at block 408 to determine an output signal representing an amount of the at least one filtered optical signal.

A neural network analysis is performed at block 410 on the output signal to determine an amount of strain applied to the structure 102.

At block 412, further processing and analysis may be performed on the amount of strain applied to the structure 102.

Figure 5:
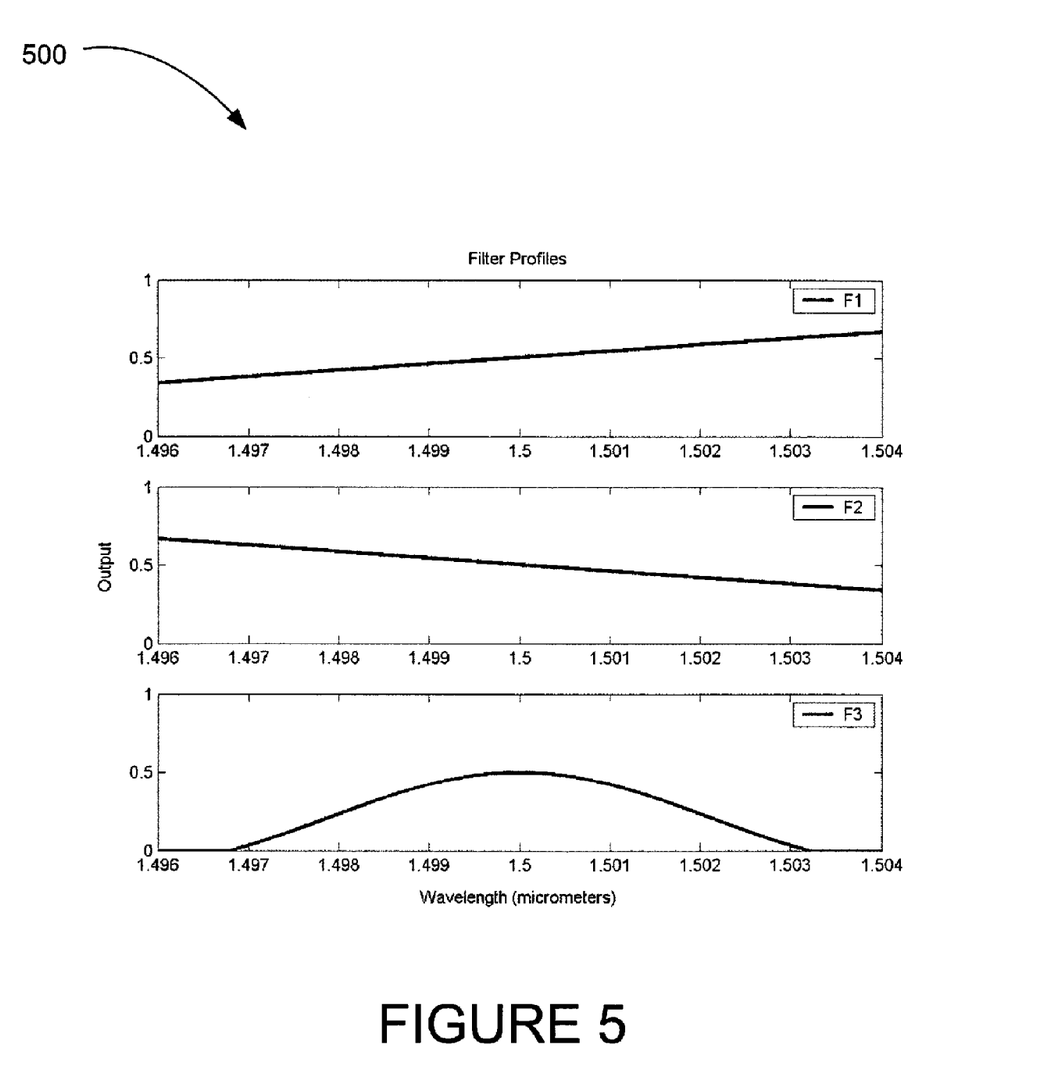
FIGS. 5-7 illustrate a chart of filter profiles according to an example embodiment.

FIG. 5 illustrates a chart 500 including three filter profiles F1, F2 and F3. The three filter profiles F1, F2 and F3 may each be a subsection of filter profiles of the one or more filters 116.1-116.n. The three filter profiles F1, F2 and F3 may each provide a signal with a shift in wavelength resulting from an application of a strain.

The detected signals from the one or more detectors 118.1-118.m may be proportional to integration of a spectrum of the reflected optical signal multiplied by a respective filter. One or more detectors 118.1-118.m may calculate an unfiltered signal that may act as a normalizing factor.

Figure 6:
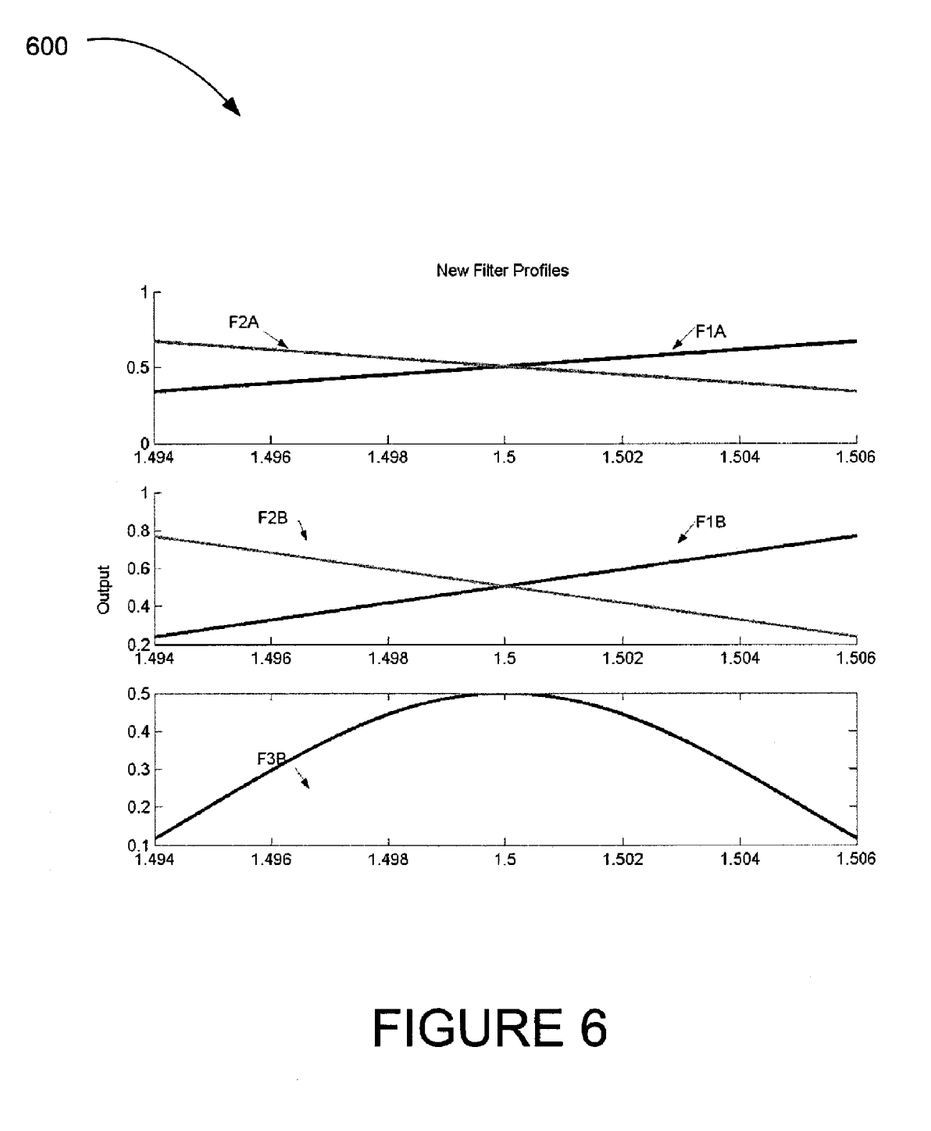

FIG. 6 illustrates a chart 600 including five filter profiles F1A, F2A, F1B, F2B and F3b. The filter profiles F1A and F2A may have a same intercept as filter profiles F1 and F2 (see FIG. 5) with a wavelength range that has been increased to 1.494 µm to 1.506 µm. The filter profiles F2B and F1B may have a slightly higher intercept, while the filter profile F3B may be broader than the filter profile F3 (see FIG. 5).

Figure 7:
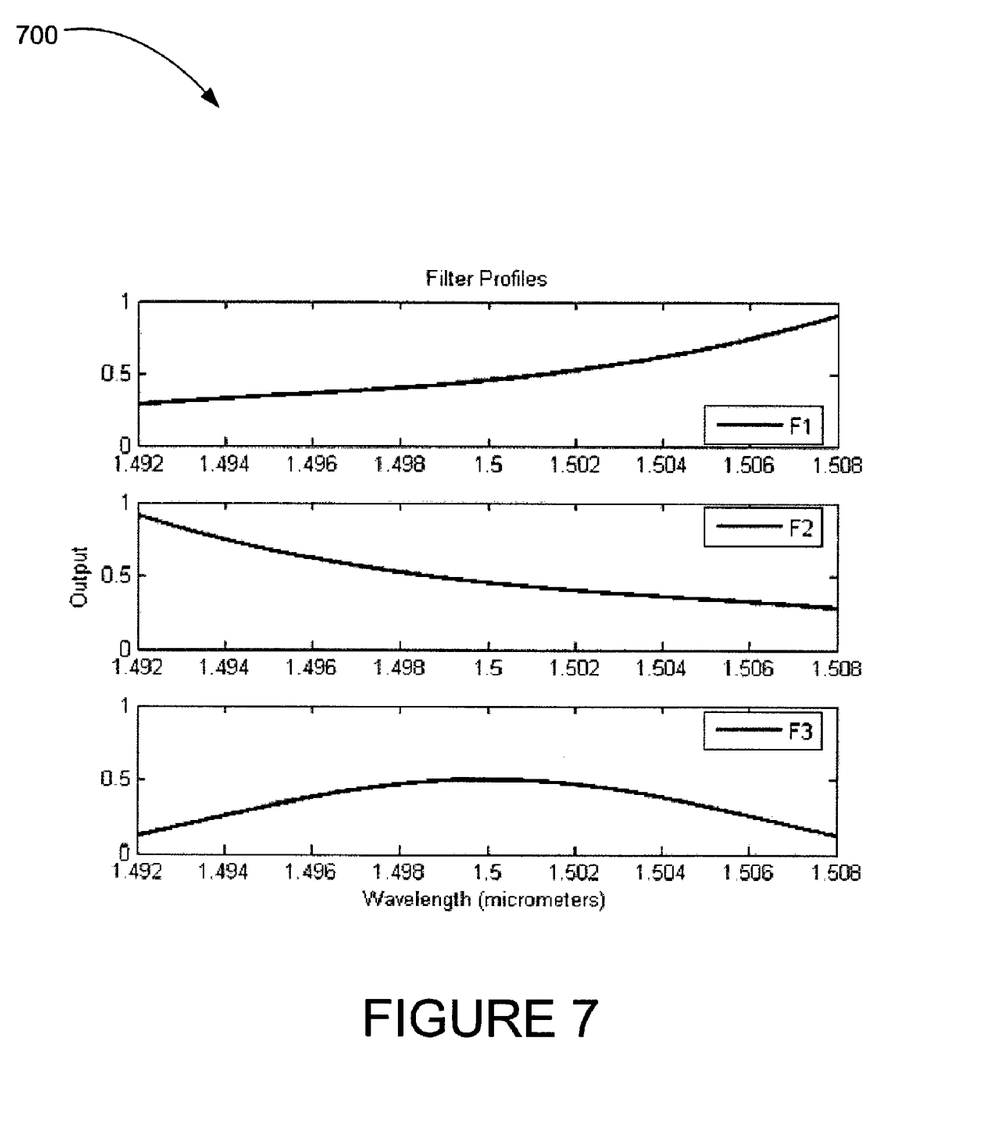

FIG. 7 illustrates a chart 700 including three filter profiles F1, F2, F3. The three filter profiles F1, F2, F3 may each be the filter profiles of FIG. 1 over an extended wavelength.

Figure 8:
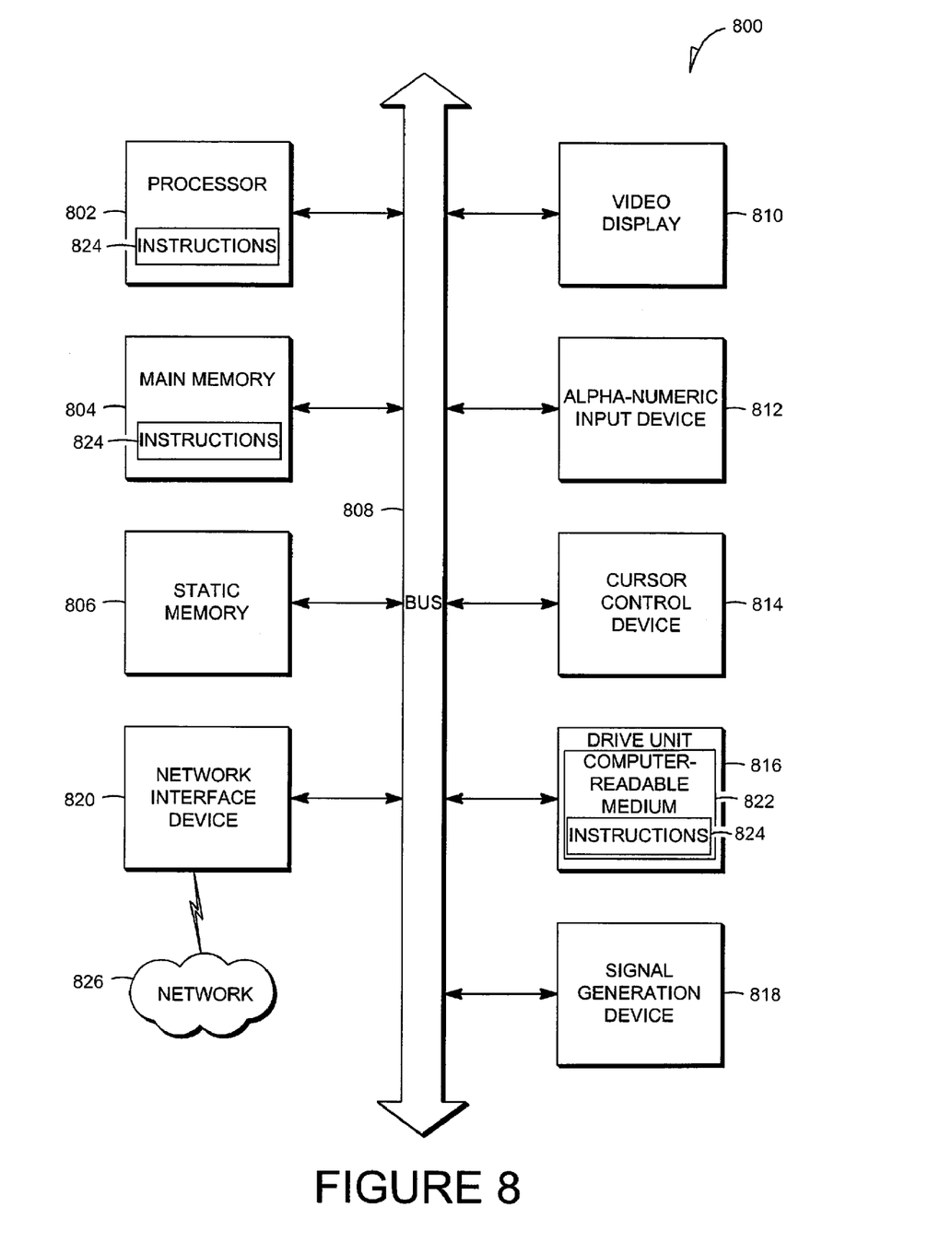
FIG. 8 shows a diagrammatic representation of machine in the example form of a computer system within which a set of instructions for causing the machine to perform any one or more of the methodologies discussed herein may be executed.

FIG. 8 shows a diagrammatic representation of machine in the example form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a television, a Personal Digital Assistant (PDA), a cellular telephone, a portable music player (e.g., a portable hard drive audio device such as an MP3 player), a car audio device, a web appliance, a network router, switch or bridge, an encoder, a detector, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The processor 802 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 802 may execute instructions and includes that portion of the computer system 800 that controls the operation of the entire computer system 800.

The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The cursor control device 814 may be a keyboard, mouse or other pointing device, trackball, touchpad, touch screen, keypad, microphone, voice recognition device, or any other appropriate mechanism for the user to input data to the computer 800 and manipulate the user interface previously discussed. Although only one input device 814 is shown, in another embodiment any number and type of input devices may be present.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via network interface device 820. The network 826 may be any suitable network and may support any appropriate protocol suitable for communication to the computer system 800. In an embodiment, the network 826 may support wireless communications. In another embodiment, the network 826 may support hard-wired communications, such as a telephone line or cable. In another embodiment, the network 826 may support the Ethernet IEEE (Institute of Electrical and Electronics Engineers) 802.3x specification. In another embodiment, the network 826 may be the Internet and may support IP (Internet Protocol). In another embodiment, the network 826 may be a local area network (LAN) or a wide area network (WAN). In another embodiment, the network 826 may be a hotspot service provider network. In another embodiment, the network 826 may be an intranet. In another embodiment, the network 826 may be a GPRS (General Packet Radio Service) network. In another embodiment, the network 826 may be any appropriate cellular data network or cell-based radio network technology. In another embodiment, the network 826 may be an IEEE 802.12 wireless network. In still another embodiment, the network 826 may be any suitable network or combination of networks. Although one network 826 is shown, in other embodiments any number of networks (of the same or different types) may be present.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The computer system 800 may be implemented using any suitable hardware and/or software, such as a personal computer or other electronic computing device. Encoders, detectors, portable computers, laptop or notebook computers, PDAs (Personal Digital Assistants), pocket computers, appliances, telephones, and mainframe computers are examples of other possible configurations of the computer system 800. For example, other peripheral devices such as audio adapters or chip programming devices, such as EPROM (Erasable Programmable Read-Only Memory) programming devices may be used in addition to, or in place of, the hardware already depicted.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
an optical sensor coupled to a structure, the optical sensor to receive a source optical signal and reflect a reflected optical signal, at least one wavelength of the reflected optical signal being spread based on a strain being applied to the structure;
a replication device coupled to the optical sensor, the replication device to receive the reflected optical signal from the optical sensor and produce a plurality of optical signals;
at least one filter coupled to the replication device to receive an optical signal from the plurality of optical signals and filter the received optical signal;
at least one detector, coupled to the at least one filter, to receive the filtered optical signal and provide an output signal representing an amount of the filtered optical signal received; and
a neural network coupled to the at least one detector, the neural network capable of learning and performing pattern recognition, the neural network to receive the output signal from the at least one detector and determine the strain on the structure based on the learning and the performing of the pattern recognition and the output signal.

2. The system of claim 1, further comprising:
an analysis subsystem to receive a further signal from the neural network for further processing and analysis.

3. The system of claim 1, wherein the optical sensor includes at least one of a fiber optical sensor or Bragg optical grating sensor.

4. The system of claim 1, wherein the number of filters of the at least one filter is equal to a number of detectors of the at least one detector.

5. The system of claim 1, wherein a number of filters of the at least one filter is one less than a number of detectors of the at least one detector.

6. The system of claim 1, wherein the neural network has characteristics of the at least one filter and uses the characteristics when determining the strain on the structure.

7. The system of claim 1, wherein the at least one filter includes a plurality of filters and the at least one detector includes a plurality of detectors, at least some filters of the plurality of filters having a different frequency range, at least some detectors of the plurality of detectors having a different output signal reflecting the different frequency range of a coupled filter, and the neural network to receive a plurality of different output signals from the plurality of detectors and determine the strain on the structure based on the learning and the performing of the pattern recognition and the different output signals.

8. The system of claim 1, wherein the at least one filter includes at least three filters, a first filter of the at least three filters having a first filter profile that is monotonically non-decreasing with a particular wave length of the at least one wavelength, a second filter of the at least three filters having a second filter profile that is monotonically non-increasing with the particular wavelength, and a third filter of the at least three filters having a third filter profile that is approximately centered with a zero strain point of the optical sensor.

9. The system of claim 1, wherein the neural network includes a plurality of interunit connection strengths, and the learning and the performing of the pattern recognition is at least performed by the plurality of interunit connection strengths.

10. The system of claim 1, wherein the neural network generates functional mapping from non-linear learning from data, and wherein capability of the learning and the performing of the pattern recognition is based on the functional mapping.

11. The system of claim 1, wherein at least some of characteristics of the at least one filter are not sufficiently known to have a functional mapping.

12. the system of claim 1, wherein the one or more filters include a low profile filter and a high profile filter, the low profile filter to provide a nearly linear change in a first linearly changed output signal to the neural network and the high profile filter to provide the nearly linear change in a second linearly changed output signal to the neural network, wherein the neural network receives the first linearly changed output signal and the second linearly changed output signal and determines the strain on the structure based on the learning, the performing of the pattern recognition, and the output signal.

13. the system of claim 1, wherein the at least one detector includes a proportional integration spectrum detector, the proportional integration spectrum detector to output a proportional output integration signal that is proportional to the integration of a spectrum of the reflected optical signal multiplied by a respective filter of the at least one filter, and wherein the neural network determines the strain on the structure based on the learning and the performing of the pattern recognition and the proportional output integration signal.

14. A method comprising:
- receiving a reflected optical signal from an optical sensor, the optical sensor coupled to a structure, at least one wavelength of the reflected optical signal being spread based on a strain being applied to the structure;
- replicating the reflected optical signal to produce a plurality of optical signals;
- filtering at least one of the plurality of optical signals to produce at least one filtered optical signal;
- detecting the at least one filtered optical signal to determine an output signal representing an amount of the filtered optical signal received; and
- using a neural network to perform a neural network analysis on the output signal to determine an amount of strain applied to the structure, the neural network capable of learning and performing pattern recognition.

15. The method of claim 14, wherein detecting further comprises:
- detecting an unfiltered optical signal from the plurality of optical signals to determine the voltage output proportional to an amount of the unfiltered optical signal.

16. The method of claim 14, wherein performing the neural network analysis comprises:
- preprocessing the output signal; and
- performing the neural network analysis on the preprocessed output to determine the amount of strain applied to the structure.

17. The method of claim 16, wherein preprocessing the output signal comprises at least one of scaling the output signal or normalizing the output signal.

18. The method of claim 14, wherein the filtering is performed by a plurality of filters having a different frequency range, the detecting is performed by a plurality of detectors having a different output signal reflecting the different frequency range of a coupled filter, and the neural network to perform the neural network analysis on a plurality of different output signals from the plurality of detectors to determine the strain applied to the structure.

19. A method comprising:
- receiving a reflected optical signal from an optical sensor, the optical sensor coupled to a structure, at least one wavelength of the reflected optical signal being spread based on a strain being applied to the structure;
- decomposing the reflected optical signal to produce a plurality of different components of the reflected optical signal;
- filtering the plurality of different components to produce a plurality of filtered components;
- detecting the plurality of filtered components to determine an output signal representing an amount of at least one of the plurality of filtered components; and
- using a neural network to perform a neural network analysis on the output signal to determine an amount of strain applied to the structure, the neural network capable of learning and performing pattern recognition.

20. The method of claim 19, further comprising:
- performing further processing and analysis on the amount of strain applied to the structure.

21. The method of claim 19, wherein the at least one wavelength of the reflected optical signal being spread based on the strain is a center wavelength with a linear shift.

22. The method of claim 19, wherein the filtering is performed by a plurality of filters having a different frequency range, the detecting is performed by a plurality of detectors having a different output signal reflecting the different frequency range of a coupled filter, and the neural network to perform the neural network analysis on a plurality of different output signals from the plurality of detectors to determine the strain applied to the structure.

* * * * *